(12) United States Patent  (10) Patent No.: US 8,276,018 B2
Kursun et al.  (45) Date of Patent: Sep. 25, 2012

(54) NON-VOLATILE MEMORY BASED RELIABILITY AND AVAILABILITY MECHANISMS FOR A COMPUTING DEVICE

(75) Inventors: Eren Kursun, Ossining, NY (US);
Philip G. Emma, Danbury, CT (US);
Stephen M. Gates, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 12/771,293

(22) Filed: Apr. 30, 2010

(65) Prior Publication Data

US 2011/0271141 A1  Nov. 3, 2011

(51) Int. Cl.
*G06F 11/00* (2006.01)
(52) U.S. Cl. ............... 714/10; 714/6.1; 714/15; 714/20; 714/30
(58) Field of Classification Search .................. 714/6.1, 714/6.31, 10, 15, 20, 23, 27, 30, 33, 37, 39, 714/45, 47.1, 47.2, 47.3
See application file for complete search history.

(56) References Cited

U.S. PATENT DOCUMENTS 6,163,856 A  12/2000 Dion et al.
6,181,975 B1  1/2001 Gross et al.
6,353,834 B1  3/2002 Wong et al.
(Continued)

FOREIGN PATENT DOCUMENTS

EP  1062581 B1  3/1999
(Continued)

OTHER PUBLICATIONS

USPTO U.S. Appl. No. 12/771,387, filed Mar. 30, 2011.
(Continued)

*Primary Examiner* — Scott Baderman
*Assistant Examiner* — Joseph D Manoskey
(74) *Attorney, Agent, or Firm* — Stephen J. Walder, Jr.; William Stock

(57) ABSTRACT

Mechanisms are provided for use with a microprocessor chip, for storing selected reliability information in an on-chip non-volatile storage device. An on-chip reliability controller coupled to one or more on-chip resources of the microprocessor chip, collects raw reliability information from the one or more on-chip resources of the microprocessor chip. The on-chip reliability controller analyzes the raw reliability information to identify selected reliability information for the one or more resources of the microprocessor chip. The on-chip reliability controller stores the selected reliability information in the on-chip non-volatile storage device. The on-chip non-volatile storage device stores the selected reliability information even in the event of an overall failure of the microprocessor chip in which the microprocessor chip loses power. The on-chip non-volatile storage device has an interface through which the selected reliability information is accessible by an off-chip device even in the event of an overall failure of the microprocessor chip.

20 Claims, 7 Drawing Sheets

U.S. PATENT DOCUMENTS

| | | |
|---|---|---|
| 6,523,130 B1 | 2/2003 | Hickman et al. |
| 6,845,306 B2 | 1/2005 | Henry et al. |
| 6,862,689 B2 | 3/2005 | Bergsten et al. |
| 6,915,447 B2 | 7/2005 | Kleiman |
| 6,941,450 B2 | 9/2005 | Atherton et al. |
| 7,164,264 B2 | 1/2007 | Anderson et al. |
| 7,205,854 B2 | 4/2007 | Liu |
| 7,386,851 B1 | 6/2008 | Zyuban et al. |
| 7,532,078 B2 | 5/2009 | Agarwal et al. |
| 7,535,035 B2 | 5/2009 | Baek et al. |
| 7,576,569 B2 | 8/2009 | Carpenter et al. |
| 7,596,726 B2 | 9/2009 | Pomaranski et al. |
| 2002/0007470 A1 | 1/2002 | Kleiman |
| 2002/0152429 A1 | 10/2002 | Bergsten et al. |
| 2003/0126133 A1 | 7/2003 | Dattatri et al. |
| 2005/0043908 A1 | 2/2005 | Bhavnagarwala et al. |
| 2005/0091369 A1 | 4/2005 | Jones |
| 2006/0080062 A1* | 4/2006 | Bose et al. ............... 702/186 |
| 2006/0277435 A1* | 12/2006 | Pedersen et al. ............ 714/30 |
| 2007/0168692 A1 | 7/2007 | Quintiliano |
| 2008/0059840 A1* | 3/2008 | Takezawa et al. ........... 714/37 |
| 2008/0172539 A1 | 7/2008 | Boss et al. |
| 2008/0294296 A1 | 11/2008 | Liu et al. |
| 2009/0006883 A1* | 1/2009 | Zhang et al. ................. 714/1 |
| 2009/0106714 A1 | 4/2009 | Culp et al. |
| 2009/0189703 A1 | 7/2009 | Chuang et al. |
| 2010/0332909 A1* | 12/2010 | Larson ........................ 714/47 |
| 2011/0126056 A1 | 5/2011 | Kelleher et al. |

FOREIGN PATENT DOCUMENTS

| | | |
|---|---|---|
| EP | 1571798 B1 | 8/2008 |
| JP | 2004094608 A2 | 3/2004 |
| WO | WO 02/077810 A1 | 10/2002 |

OTHER PUBLICATIONS

Muller, Gerhard et al., "Status and Outlook of Emerging Nonvolatile Memory Technologies", Infineon Technol. AG, Munich, Germany, Electron Devices Meeting, 2004, IEDM Technical Digest, IEEE International, Dec. 13-15, 2004, pp. 23.1.1-23.1.4.

Coskun, Ayse K. et al., "Proactive Temperature Balancing for Low Cost Thermal Management in MPSoCs", IEEE/ACM Int. Conf. on Comp.-Aided Des., 2008, pp. 250-257.

Eaton, Ian, "The Ins and Outs of System Logging Using Syslog", SANS Institute, 2003, 53 pages.

Zhong, Zheng-Yu et al., "An On-Chip Monitor for Measuring NBTI Degradation of Digital Circuits", 16th IEEE IPFA, Jul. 6-10, 2009, pp. 468-471.

Office Action mailed Jun. 11, 2012 for U.S. Appl. No. 12/771,387; 17 pages.

* cited by examiner

CRITICAL INFORMATION STORAGE DEVICE
420

| UNIT ID | FAIL LEVEL | THRESHOLD IDS | FAILURE HISTORY INFORMATION |
|---|---|---|---|
| CORE 1 | 2 | 1/2/7 | LVL. 4 (01/01/08 – 01/02/08); LVL. 2 (06/09/07 – 06/09/07 |
| CORE 2 | 1 | 2 | LVL. 1 (01/01/07 – 01/02/07); LVL. 3 (06/09/05 – 06/09/05) |
| CORE 3 | 5 | NONE | NONE |
| CORE 4 | 5 | NONE | NONE |
| CORE 5 | 3 | 3, 4, 5 | LVL. 4 (05/01/08 – 07/01/08); LVL. 4 (02/02/07 – 03/02/07) |

NON-VOLATILE MEMORY BASED RELIABILITY AND AVAILABILITY MECHANISMS FOR A COMPUTING DEVICE

BACKGROUND

The present application relates generally to an improved data processing apparatus and method and more specifically to non-volatile memory based reliability and availability mechanisms for computing devices.

System level reliability is a selected design constraint for many computing devices, such as server computing devices. Redundant computational units, reliability engines, and other dedicated reliability functionality are common practice in current high-end server designs. While reliability can be generally improved through such functionality, the recovery time is not improved since the reliability functions also fail with the rest of the server in a serious failure condition.

Most processors in the market today contain functionality for the sole purpose of improving reliability. While such functionality is effective in enhancing reliability, they are of limited use when there is a serious failure that causes the computing device, e.g., the server, to power down. Most of the data stored in the specialized controllers, table data structures, and other reliability engines are lost at power down.

In theory, such data in these reliability structures can be stored in external software logs which can be available after the server powers down. However, this involves data center level server logs which require specialized software to sort through a significant amount of data to analyze the source of failure. Furthermore, if the failure is caused by software, such information can be lost at power down since the state of the software is not maintained even in these external server logs, leaving not much meaningful data to do diagnostics.

SUMMARY

In one illustrative embodiment, a method, in a data processing system, is provided for storing selected reliability information in an on-chip non-volatile storage device. The method comprises collecting, by an on-chip reliability controller coupled to one or more on-chip resources of a microprocessor chip, raw reliability information from the one or more on-chip resources of the microprocessor chip. The method further comprises analyzing, by the on-chip reliability controller, the raw reliability information to identify selected reliability information for the one or more resources of the microprocessor chip. Moreover, the method comprises storing the selected reliability information in the on-chip non-volatile storage device. The on-chip non-volatile storage device stores the selected reliability information even in the event of an overall failure of the microprocessor chip in which the microprocessor chip loses power. The on-chip non-volatile storage device has an interface through which the selected reliability information is accessible by an off-chip device even in the event of an overall failure of the microprocessor chip.

In other illustrative embodiments, a computer program product comprising a computer useable or readable storage medium having a computer readable program stored thereon is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4B is an example diagram of a data structure for storing selected information, historical information, and the like, in accordance with one illustrative embodiment of an on-chip non-volatile storage device;

DETAILED DESCRIPTION

Figure 1:
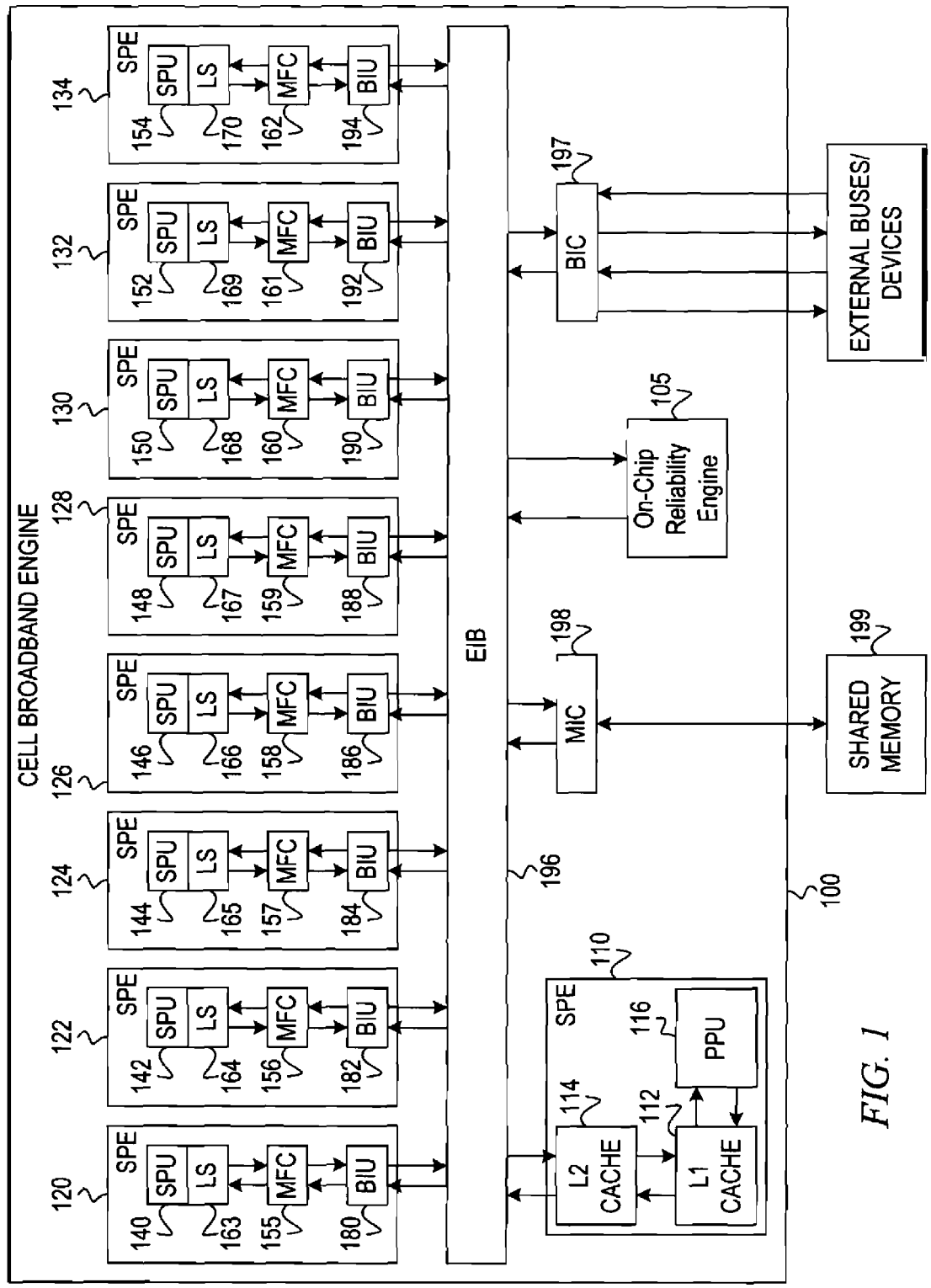
FIG. 1 is an exemplary block diagram of a data processing system in which aspects of the present invention may be implemented.

An on-chip reliability engine collects and analyzes information from various sensors, hardware counters, diagnostic circuits, and the like, such as thermal sensors, ring oscillators, skitter and critical path monitors, hardware usage counters, etc., provided on the chip. The on-chip reliability engine also collects information on soft-error profiles and non-critical hard-error profiles over time. After compiling and analyzing all the sensor and counter information, the on-chip reliability engine assess a reliability profile of the chip and updates an on-chip non-volatile memory based reliability and availability unit with the most critical portions of information from this analysis. Such updates may be made on a periodic or continual basis.

The illustrative embodiments provide non-volatile memory based reliability and availability mechanisms for computing devices. When there is a major failure of the computing device, the on-chip reliability engine's information, such as reliability controller tables as well as per core reliability information, are lost. However, the critical portions of this information, if not all of this reliability information, is maintained in a copy of this information stored in the non-volatile memory based reliability and availability unit. As a result, the reliability information that would otherwise be lost, is not lost when the mechanisms of the illustrative embodiments are implemented. This reliability information that is retained in the non-volatile memory based reliability and availability unit may be scanned out using a standard tester or off-chip recovery assistance unit for faster recovery of the chip and the computing system as a whole.

After the off-chip recovery assistance unit or tester performs its diagnostics on the information scanned out from the non-volatile memory based reliability and availability unit, the same tester or off-chip recovery assistance unit can be used to overwrite the existing chip configuration information to prevent future failures of the sort. For example, if the off-chip recovery assistance unit or tester determines, through its diagnostics, that the failure occurred due to severe overheating and the failure of emergency thermal response mechanisms, the tester/off-chip recovery assistance unit may configure the chip to run at a lower frequency, less aggressive mode of operation with a lower thermal threshold, or the like, to avoid future failures of this sort. Moreover, the details of this particular failure may be stored in the system for the on-chip reliability engine to effectively manage the on-chip resources from that point on with regard to this source of potential failure.

The illustrative embodiments may be utilized in many different types of data processing environments and computing devices. For example, the mechanisms of the illustrative embodiments may be implemented in conjunction with a single processor computing system, multiple processor computing system, symmetric multiprocessor (SMP) system, heterogeneous multiprocessor system, or the like. The various types and configurations of computing devices in which mechanisms of the illustrative embodiments may be implemented cannot be succinctly described herein due to the sheer number of these types and configurations. However, in order to provide examples of some configurations in which the mechanisms of the illustrative embodiments may be implemented, FIGS. 1-2 are provided hereafter.

Figure 2:
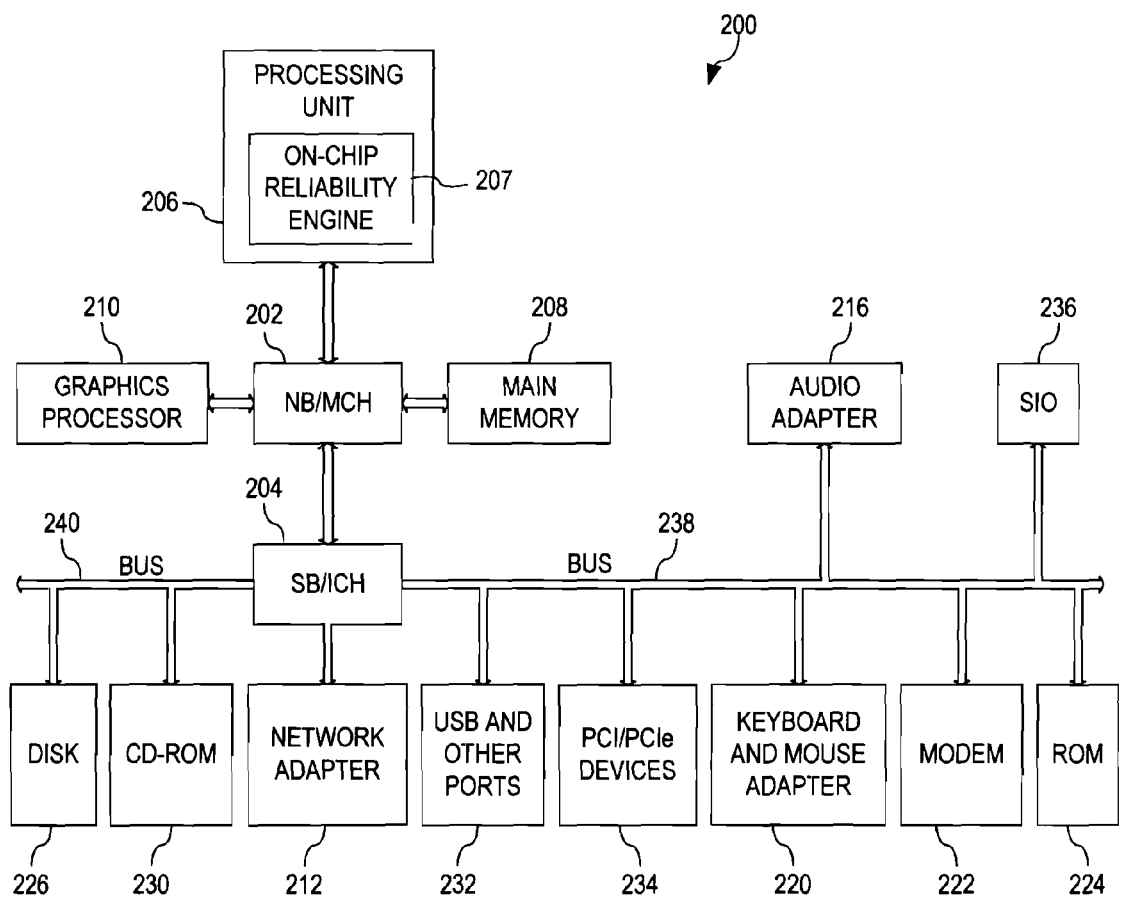
FIG. 2 is an example block diagram of another type of data processing system in which aspects of the illustrative embodiments may be implemented.

FIG. 1 is an exemplary block diagram of a data processing system in which aspects of the present invention may be implemented. A "data processing system" as the term is used herein means any device configured to process data and may encompass many different types of device/system architectures, device/system configurations, and combinations of device/system architectures and configurations. Typically, a data processing system will include at least one processor and at least one memory provided in hardware, such as on an integrated circuit chip. However, a data processing system may include many processors, memories, and other hardware and/or software elements provided in the same or different computing devices. Furthermore, a data processing system may include communication connections between computing devices, network infrastructure devices, and the like.

FIG. 1 is an example of a heterogeneous multiprocessor system on a chip in which the mechanism of the illustrative embodiments may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

As shown in FIG. 1, the chip that comprises the CBE 100 may further include an on-chip reliability engine 105 that is responsible for monitoring the operation of the various hardware elements of the CBE 100 and attempting to ensure the reliability of the CBE 100 by analyzing the operation of the various hardware elements to determine possible sources of problems. Based on such determinations, the operation of the hardware elements of the CBE 100 may be adjusted as need be to ensure reliability.

In accordance with the illustrative embodiments, the on-chip reliability engine 105 provides a non-volatile memory based reliability and availability mechanism. The on-chip reliability engine 105 collects and analyzes information from various sensors, hardware counters, diagnostic circuits, and the like (not shown), such as thermal sensors, ring oscillators, skitter and critical path monitors, hardware usage counters, etc., provided on the chip. The on-chip reliability engine 105 may collect information on soft-error profiles and non-critical hard-error profiles over time and generate a reliability profile having reliability information for the various hardware elements, wear-out information for the various hardware elements, and the like. After compiling and analyzing all the sensor and counter information, the on-chip reliability engine assess the reliability profile of the chip and updates an on-chip non-volatile memory based critical information table data structure with the most critical portions of information from this analysis. Such updates may be made on a periodic or continual basis.

In the event of a major failure of the CBE 100, the on-chip reliability engine 105 is able to provide the critical information maintained in the critical information table data structure to external devices, such as an external tester/recovery assist unit which may be provided off-chip. As a result, the reliability information that would otherwise be lost is not lost when the mechanisms of the illustrative embodiments are implemented. This reliability information that is retained in the non-volatile memory based critical information table data structures may be scanned out to the external device for faster recovery of the chip and the computing system as a whole.

The external device may perform diagnostics on the critical information scanned out from the non-volatile memory and determine an appropriate chip configuration to avoid such major failures in the future. This chip configuration may be used to update chip configuration information maintained in the non-volatile memory of the on-chip reliability engine 105.

FIG. 2 is an example block diagram of another type of data processing system in which aspects of the illustrative embodiments may be implemented. Data processing system 200 is an example of a single processor unit based system, with the single processor unit comprising one or more on-chip computational cores, or processors. In this example, the processing unit 206 may constitute a single chip with the other elements being provided by other integrated circuit devices that may be part of a motherboard, multi-layer ceramic package, or the like, to collectively provide a data processing system, computing device or the like. The chip comprising the processing unit 206 may further include an on-chip reliability engine 207 in accordance with the illustrative embodiments of the present invention as set forth herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, such as a SMP, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Regardless of the particular computing device/system or data processing environment used, the mechanisms of the illustrative embodiments provide a hardware based on-chip reliability engine, e.g., on-chip reliability engine 105 in FIG. 1 or on-chip reliability engine 207 in FIG. 2, that stores critical reliability and availability information gathered from on-chip sensors, hardware counters, diagnostic circuits, or the like, in a non-volatile manner. As a result, in the event of a major failure of the chip, or a component of the chip, reliability and availability information that is normally lost due to the major failure is maintained within the non-volatile mechanism of the on-chip reliability engine and can be accessed by off-chip recovery units/testers for purposes of diagnosing the failure and reconfiguring the chip to avoid or lessen the likelihood of such failures in the future.

Figure 3:
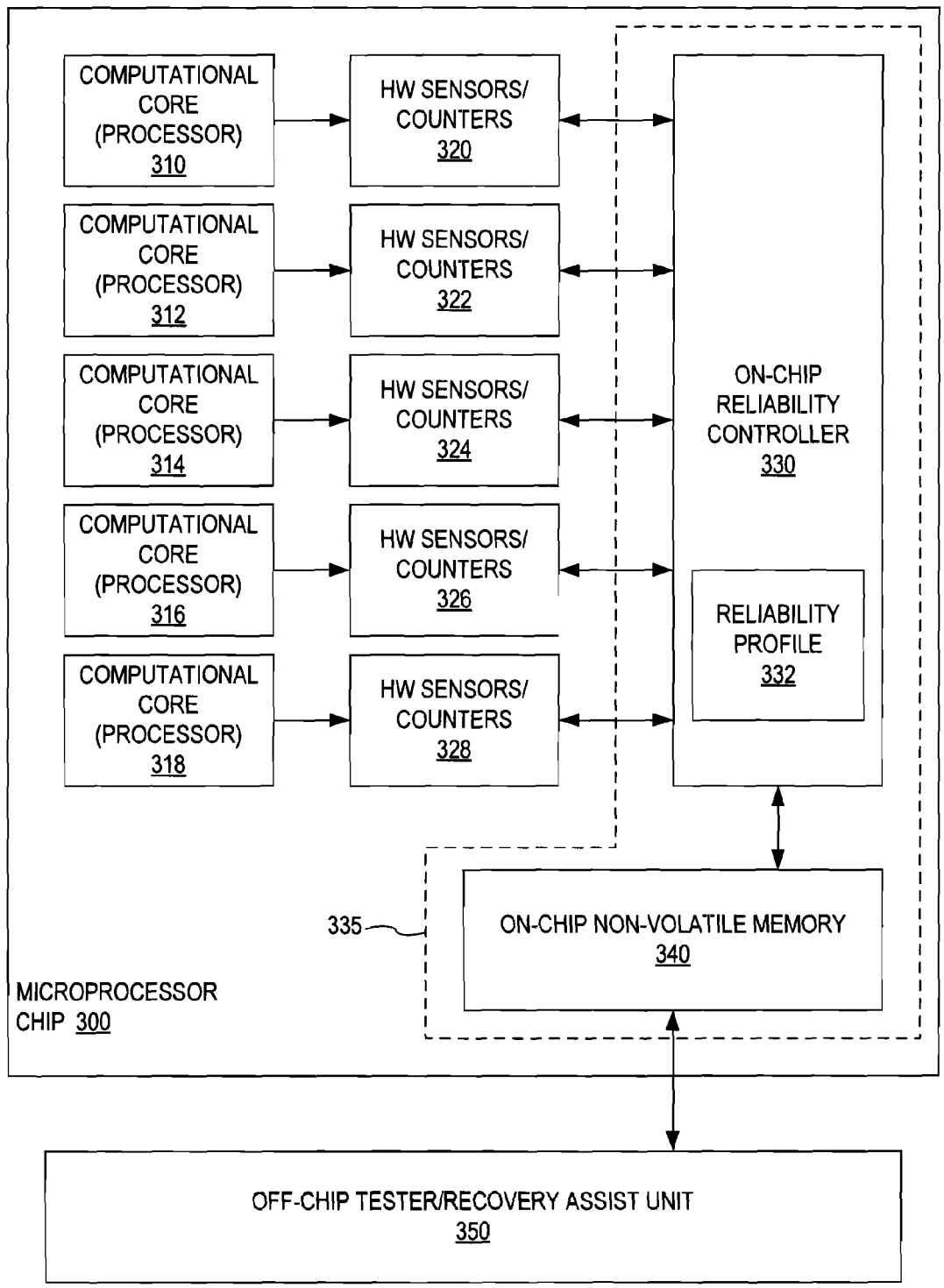
FIG. 3 is an example block diagram of an on-chip reliability engine in accordance with one illustrative embodiment.

FIG. 3 is an example block diagram of an on-chip reliability engine 335 in accordance with one illustrative embodiment. The on-chip reliability engine 335 shown in FIG. 3 may be an example of the on-chip reliability engine 105 in FIG. 1 or the on-chip reliability engine 207 in FIG. 2, for example.

As shown in FIG. 3, the chip 300 includes a plurality of computational cores or processing and storage units 310-318. These computational cores 310-318 may be, for example, the SPEs 120-134, the processing unit 206 in FIG. 2, or the like. A plurality of on-chip sensors and hardware counters 320-328, and/or other diagnostic circuits, are coupled to the computational cores 310-318 for monitoring the operation of the computational cores 310-318 and collecting raw data representing measures of various operational characteristics of the computational cores 310-318. For example, the sensors/hardware counters 320-328 may include one or more of thermal sensors, ring oscillators, skitter and critical path monitors, hardware usage counters, or any other known or later developed sensors/hardware counters 320-328 that may gather data representative of one or more operational characteristics of the computational cores 310-318.

The raw data collected by the sensors/hardware counters 320-328 is provided to the on-chip reliability controller 330 of the on-chip reliability engine 335. The on-chip reliability controller 330 analyzes the raw data from the various sensors/hardware counters 320-328 for purposes of managing and maintaining the on-chip resources so as to keep the chip working properly as much as possible. In order to perform the analysis, the on-chip reliability controller 330 may make use of a list of acceptable operation states for the hardware elements, list of threshold conditions, and the like, for determining whether the raw data from the sensor/hardware counters 320-328 represent conditions indicative of a failure or situation requiring action to maintain the reliability of the chip.

For example, based on the analysis of the raw data, a reliability profile 332 may be generated that specifies the thresholds violated by the operation of the computational cores 310-318, if any, the severity of the violations, whether the violation corresponds to a soft error or hard error, soft error and hard error rates, hotspot conditions, performance deterioration information, and other basic reliability and wear-out information, as described in greater detail hereafter. Based on this information, and operational configuration settings for the chip, e.g., operational frequency ranges, operational temperature ranges, etc., the on-chip reliability controller 330 may adjust the operation of the chip, if possible, so as to maintain the chip within acceptable operational ranges. Such adjustments may involve initiating thermal response mechanisms, reducing operational frequencies, or the like.

The collection of the raw data and the subsequent analysis by the on-chip reliability controller 330 allows the on-chip reliability controller 330 to collect information regarding soft error profiles and non-critical hard error profiles over time. This raw data and soft error/hard error information may be stored, for example, in a memory of the on-chip reliability controller 330 as per core reliability table data structures, reliability controller table data structures, or the like, in the reliability profile 332. What is meant by the term "soft error" is a signal or datum which is wrong, but is not assumed to imply a mistake in design or construction, or a broken component. After observing a soft error, there is no implication that the system is any less reliable than before. A "hard error," on the other hand, is an error that is indicative of a mistake in design or construction, or a broken component. Based on the raw data received from the sensors/hardware counters 320-328, logic of the on-chip reliability controller 330 may determine the existence of soft errors and/or hard errors over time.

After compiling and analyzing the raw data from the various sensors/hardware counters 320-328, the on-chip reliability controller 330 assesses the compiled reliability profile 332 of the chip and updates the on-chip non-volatile memory 340 with the most critical portions of the information from the analysis of the raw data. A finite state machine or other logic provided within the on-chip non-volatile memory 340, the on-chip reliability controller 330, or the like, may operate to filter information in the reliability profile 332 to select the most critical portions of the reliability and wear-out information in the reliability profile 332. The logic or finite state machine (FSM) may operate to perform various levels of filtering. For example, at a simple level, the logic/FSM may look at a severity level of reliability information to determine which reliability information to include in the update of the on-chip non-volatile memory 340. The logic/FSM may also perform more complex filtering by looking at a combination of factors including the type of threshold violations, if any, a severity level of the threshold violations, whether the violation is indicative of a soft error or hard error, and/or other factors when determining whether a particular portion of the reliability profile 332 information should be included in the update of the on-chip non-volatile memory 340.

The most critical reliability information is maintained in the on-chip non-volatile memory 340 for purposes of reliability determinations and determinations of reasons for failure. This critical reliability information is accessible by off-chip mechanisms in the event of a major failure of the chip or system. The on-chip reliability controller 330 may write the most critical reliability information to the on-chip non-volatile memory 340 on a continuous or periodic basis. For example, raw data and analysis information may be compiled over a predetermined time and written to the on-chip non-volatile memory 340 at the end of the predetermined time period.

The critical reliability information may take many different forms. For example, the critical reliability information may be the raw data itself, or portions of the raw data, or may be results of the analysis performed on the raw data or portions of the raw data. The critical reliability information preferably provides information indicative of the conditions of the resources of the chip that fall outside an acceptable range of operational conditions. For example, the critical reliability information may include indications of which chip resources', e.g., hardware elements such as computational cores, functional units of the computational cores, memory structures, etc., operational conditions fall outside an acceptable range of operational conditions, the particular thresholds exceeded, the number of times, date and time range, or the like, when such operational conditions were detected to fall outside the acceptable range, a level of criticality of the conditions, etc.

The on-chip non-volatile memory 340 may take many different forms including one or more banks of eFuses, an electrically erasable programmable read only memory (EEPROM), magnetoresistive random access memory, or the like. The on-chip non-volatile memory is preferably re-writable such that as new critical reliability information is generated by the on-chip reliability controller 330, this information may overwrite existing critical reliability information in the on-chip non-volatile memory 340. However, this is not a requirement. To the contrary, in embodiments where an imminent failure of the chip is detected, the on-chip reliability controller 330 can use this determination of an imminent failure to initiate collection of raw data and analysis to generate critical reliability information for storage into the on-chip non-volatile memory 340. Thus, the writing of critical reliability information into the on-chip non-volatile memory 340 may be triggered by this predicted imminent failure and therefore, it may not be necessary to have a re-writable on-chip non-volatile memory 340 as long as this memory can be zeroed out upon initialization of the chip.

The non-volatile memory based mechanisms in FIG. 3 are constructed on a microprocessor chip using one of any of a plurality of technologies and include the access circuits controlling read and write operations. The non-volatile memory 340 and its access circuits may be fabricated on the microprocessor chip, either in the Back End of Line (BEOL) wiring levels (i.e. wiring levels used to interconnect components, such as transistors, resistors, or the like, on the wafer), or on the silicon substrate. Within the scope of the present invention, in some illustrative embodiments, a separate memory chip (fabricated with non-volatile technology, such as flash, magnetic random access memory, or another technology) may be used, in a multichip module (MCM) connected to the microprocessor, for the storage function.

In one illustrative embodiment, the non-volatile memory 340 is fabricated as a resistive random access memory (RRAM) in which resistive elements are comprised of a phase change material (PCM), thereby providing a phase change memory. An example of this technology and read/write circuits is available from the Numonyx Corporation in which a non-volatile memory is built within the BEOL wiring levels of the integrated circuit. Within the scope of the illustrative embodiments, similar related PCM technologies may be used.

In another illustrative embodiment, the non-volatile memory 340 is fabricated as an oxide resistive memory (OxRAM) array, similar to that described in Baek et al., U.S. Pat. No. 7,535,035. As is known in the art, there are many potential non-volatile memory technologies available for use within the illustrative embodiments of the present invention. A review of some of these technologies is provided in Muller et al., "Status and Outlook of Emerging Nonvolatile Memory Technologies," Infineon Technol. AG, Munich, Germany, Electron Devices Meeting, 2004, IEDM Technical Digest, IEEE International, 13-15 Dec. 2004. Bit density, power consumption, retention time, cost, and other considerations are used to select the particular technology used to generate the non-volatile memory 340 in the particular illustrative embodiments.

When there is a major failure of the chip or the system, all the raw data and results of analysis stored in the reliability controller 330, the sensors/hardware counters 320-328, etc. is typically lost. However, the non-volatile memory 340 stores the most critical portions of this data/information and thus, is able to provide it to the off-chip tester/recovery assist unit 350 for purposes of performing recovery and reconfiguring of the chip so as to minimize the likelihood that a same failure due to a same failure source occurs in the future.

The off-chip tester/recovery assist unit 350 may perform various diagnostic analysis operations on the information scanned out from the on-chip non-volatile memory 340. For example, the off-chip tester/recovery assist unit 350 may look at the critical data/information and determine that the temperature of the chip was above acceptable levels and that the emergency thermal response mechanisms of the chip did not operate sufficiently to control the temperature to be within acceptable levels and, as a result, the chip failed due to sever overheating. As another example, the computation units or core may experience wear-out due to elongated periods of high activity. As a result the performance data collected from the chip sensors/counters as well as other data from delay chain structures and the like, may indicate that the core has experienced wear out. This information is stored in the on-chip non-volatile memory 340. When the failure occurs the sensor information and wear-out assessment performed by the on-chip reliability controller 330 will indicate the source of failure in the on-chip non-volatile memory 340. For each main sensor structure (or a combination of sensors) there are sets of threshold values for which the sensor readings indicate normal operation. When these values are exceeded the reliability controller 330 tracks the magnitude of the difference and the type of sensor that collected the information to determine the failure and the source of the failure. These are but examples. It should be appreciated that other types of diagnostics can be performed as well do identify various other types of failures and sources of failure, without departing from the spirit and scope of the illustrative embodiments.

The diagnostics performed by the off-chip tester/recovery assist unit 350 may result in a the off-chip tester/recovery assist unit 350 determining new configuration settings for the chip that will minimize the likelihood of the same failure occurring again in the future due to the same failure source. For example, the off-chip tester/recovery assist unit 350 may determine a new operational frequency/less aggressive mode of operation for the computational cores 310-318 to make these cores 310-318 operate at a lower temperature to avoid future failures due to the temperature exceeding thermal thresholds for the chip. This new configuration setting may be communicated from the off-chip tester/recovery assist unit 350 back to the on-chip reliability controller 330 via the on-chip non-volatile memory 340. That is, the off-chip tester/recovery assist unit 350 may overwrite a portion 342 of the on-chip non-volatile memory 340 that is set aside for configuration settings with the new configuration settings determined as a result of the diagnostics performed. The on-chip reliability controller 330 may access these configuration settings, such as upon initialization of the chip, so as to control the operation of the computational cores 310-318 based on these configuration settings from a reliability stand-point.

Thus, with the mechanisms of the illustrative embodiments, a fast and effective technique is provided for storing and maintaining critical reliability information in the hardware of the chip itself in a non-volatile manner. As a result, the critical reliability information is maintained even after a major failure of the chip and can be used to diagnose the type of failure and the source of the failure. Based on this diagnosis, the on-chip reliability mechanisms of the illustrative embodiments can be used to reconfigure the chip with new configuration settings that cause the chip to operate in a different manner so as to reduce the likelihood of a same failure occurring due to the same failure source.

Figure 4A:
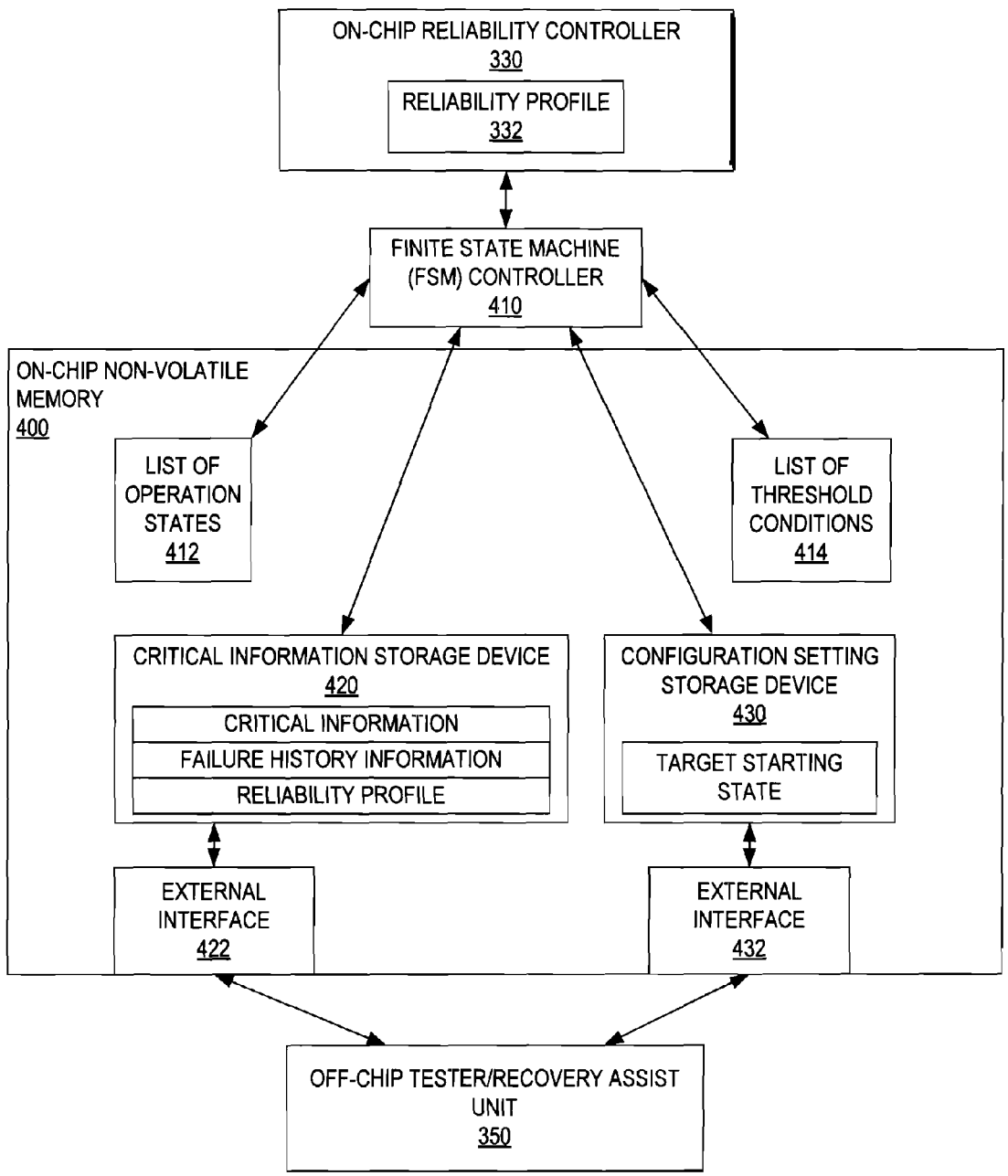
FIG. 4A is an example block diagram of the on-chip non-volatile memory in accordance with one illustrative embodiment.

FIG. 4A is an example block diagram of the on-chip non-volatile memory in accordance with one illustrative embodiment. As shown in FIG. 4A, the on-chip non-volatile memory 400 interfaces with a finite state machine (FSM) controller 410. The on-chip non-volatile memory 400 includes a list of operation states data structure storage device 412, a list of threshold conditions data structure storage device 414, a critical reliability information storage device 420, and a configuration setting storage device 430. Each of these devices may be implemented in hardware on the chip. For example, these devices may be separate memory structures, data structures in a same memory structure, or the like.

The FSM controller 410 interfaces with the on-chip reliability controller 330 of the chip. In one illustrative embodiment, the functionalities of the on-chip reliability controller 330 include collecting on-chip sensor information, assessing reliability characteristics of the cores, comparing with thresholds and preset conditions, and updating the non-volatile memory structures, as previously described. The on-chip finite state machine (FSM) controller 410 is primarily used for filtering out the non-critical information and updating the on-chip non-volatile memory 400. It should be appreciated, however, that the inclusion of a separate FSM controller 410 is not necessary and in other illustrative embodiments, the functionality of the FSM controller 410 may be integrated into the on-chip reliability controller 330. In yet another illustrative embodiment, where the on-chip reliability controller 330 may not exist, the functionalities of the on-chip controller 330 can be taken over by the finite state machine.

The FSM controller 410 controls the flow of critical reliability information to the critical reliability information storage device 420 from the on-chip reliability controller 330. The FSM controller 410 further controls the flow of configuration setting information from the configuration setting storage device 430 to the on-chip reliability controller 330 when the on-chip reliability controller 330 is involve in a restart of the chip after a major failure. Alternatively, the on-chip reliability controller 330 may access the information stored in the various structures directly without having to go through the FSM controller 410 using a separate interface (not shown).

The list of operation states data structure storage device 412 stores a set of acceptable operational states for starting the chip. This information may be determined by a manufacturer or the like and stored in this storage device 412 when the chip is manufactured. For example, this list of operation states may include a number of required operational computational cores needed to start the chip, a required frequency of the computational cores, etc. This information may be a basis against which a chip configuration setting as stored in the configuration setting storage device 430 may be compared to determine if the chip is able to be restarted after a major failure. For example, if the chip configuration setting has too few computational cores included in a list of computational cores to start up during a restart operation when compared to the list of operation states, then the chip may not be restarted and an error message may be output by the on-chip reliability controller 330.

The list of threshold conditions 414 stores a list of conditions of various resources, hardware elements, or the like, of the chip that are indicative of an improper operational state of these resources, elements, etc. That is, operational states of these resources, elements, etc., that violate the established thresholds in this list of threshold conditions 414 are indicative of a failure condition which may cause reliability information to be stored in the reliability profile 332 and possibly used to update the critical information storage device 420 if determined to be of a critical nature. The list of threshold conditions 414 may further define criteria for evaluating whether reliability information is of a critical nature or not such that it may be used to update the critical information storage device 420.

The configuration setting storage device 430 stores an ideal configuration setting determined based on the existing reliability problems and history data and reflects a configuration setting of the chip that best suits the state of the hardware. This configuration information includes a combination of structures with minimum reliability problems, with sensor data within acceptable ranges, etc., that are to be used for post-failure recovery. This configuration information may be set in the configuration setting storage device 430 by an external or off-chip tester/recovery assist unit or the like.

The critical reliability information storage device 420 stores critical reliability information as determined by the analysis performed by the on-chip reliability controller 330. In addition, the critical reliability information storage device 420 may further store other information including a critical reliability information history for past failures. That is, critical reliability information that was collected for past failures may be maintained in the critical reliability information storage device 420 and provided to the on-chip reliability controller 330 via the FSM controller 410 and/or to the off-chip tester/recovery assist unit 350. Based on this history information, in addition to current critical reliability information, additional analysis and diagnosis can be performed. For example, the history information can be used to identify reoccurring failures and sources of failure. Based on these reoccurrences of the failure or the same source of failure for the same or different failures, different configuration settings may be established for the chip to circumvent the source of the failure, or provide further assurances against repetition of the same failure in the future.

The critical reliability information, history information, and reliability profile for the chip may be organized on a per computational and/or storage unit, such as per core and possibly even per functional unit of the cores for more advanced recovery aid. In one illustrative embodiment, the critical reliability information, history information, and reliability profile may be organized as one or more table data structures in which entries comprise a core identifier, an assessed level of criticality of conditions of the core, a corresponding threshold or thresholds that have been violated, a history of any past failures along with a length and criticality of the conditions leading to the failures, details of the condition failures, and the like. In short, this information may be organized at various granularities and in various configurations without departing from the spirit and scope of the illustrative embodiments.

FIG. 4B is an example diagram of a data structure for storing critical information, historical information, and the like, in accordance with one illustrative embodiment of an on-chip non-volatile storage device, such as the critical information storage 420 in FIG. 4A. As shown in FIG. 4B, the data structure includes one or more entries for each of the computational cores, processors, and/or other functional units of the chip whose performance is being monitored for reliability purposes. In the depicted example, there is an entry for each computational core on the chip, although this is but one non-limiting example.

Each entry in the depicted example includes a field 424 to identify the computation core, processor, and/or other functional unit to which the entry corresponds. Each entry further includes a field 425 for identifying an overall failure criticality level of the corresponding computation core, processor, and/or functional unit. This criticality level may be calculated, such as by the on-chip reliability controller 330, the off-chip tester/recovery assist unit 350, or the like, in any desirable manner. For example, the failure criticality for a particular computational core may be set to the criticality level of the most recent failure experienced by the computational core. Alternatively, the failure criticality of the computational core, processor, and/or functional unit may be based on the failure history information stored in the field 427, where a combination of the criticality of the failures experienced by the corresponding computational core, processor, and/or functional unit are used as the basis for calculating the overall failure criticality level. For example, a simple calculation of taking the most critical level of failure experienced by the computational core, processor, and/or functional unit may be used. Alternatively, an average and/or a weighting of criticality levels of failures experienced may be used to determine an overall failure criticality level for the computational core, processor, and/or functional unit. Any evaluation of failure criticalities experienced by the corresponding computational core, processor, and/or functional unit.

Furthermore, each entry may include a field 426 for storing a list of zero or more threshold identifiers of thresholds that have been violated by operational characteristics of the corresponding computational core, processor, and/or other functional unit. That is, each threshold may have an associated identifier and when an operational characteristic of the computational core, for example, exceeds that threshold, then the threshold identifier may be stored in field 426 in association with that identifier of the computational core. Each threshold may further have an associated criticality level to identify a failure criticality measure associated with a violation of the corresponding threshold. This information may be stored in the on-chip reliability controller 330, the off-chip tester/recovery assist unit 350, or the like, such that the particular unit making the evaluation of failure criticality may consult this information when making the evaluation.

Each entry in the data structure may further have a failure history information field 427. This field 427 may store failure criticality level information for the corresponding computational core, processor, and/or functional unit over a period of time. This history information may be updated in a cumulative manner so as to maintain history information over a predetermined period of time for use in evaluating the reliability of the corresponding computational core, processor, and/or functional unit. For example, one use of the history information in field 427 is in computing an overall failure level of the computational core, processor, and/or functional unit for storage in field 425.

It should be appreciated that the configuration shown in FIG. 4B is only an example and is not intended to state or imply any limitation with regard to the types of information that may be stored in the on-chip non-volatile storage device or the particular configuration of such information. For example, while a single table data structure is shown in FIG. 4B, this information may instead by provided in two or more separate data structures along with additional critical information, history information, and reliability profile information. These separate data structures may be linked to one another or may be completely separate. In one example, each data structure may be provided at a different granularity of the units whose reliability is being monitored. For example, one data structure may provide critical information for the computational core as a whole, another data structure may provide critical information for particular floating point units within the computational cores, yet another data structure may provide critical information for fixed point units, etc. Any combination of critical information and any configuration of critical information being stored in the on-chip non-volatile storage devices is intended to be within the spirit and scope of the present invention.

Based on the information in the data structure of FIG. 4B, the off-chip tester/recovery assist unit may diagnose problems and perform other analysis for identifying failures and sources of failure in the chip. This information may further be used determine a target starting state for storage in the configuration setting storage device 430, as described hereafter. For example, the failure level in field 425 may be used as a basis by which to select which computational cores, processors, and/or functional units to include in the target starting state for purposes of restarting the chip.

Returning to FIG. 4A, the critical reliability information storage 420 further has an interface 422 through which an off-chip tester/recovery assist unit 350 may access the information stored in the critical reliability information storage device 420. The critical reliability information may be accessed by the off-chip tester/recovery assist unit 350 via the interface 422 in response to, for example, a major failure of the chip on which the non-volatile memory 400 is provided. The off-chip tester/recovery assist unit 350 may further write, or update, a reliability profile stored in the critical reliability information storage device 420 via the interface 422 based on results of analysis, diagnostics, etc., performed by the off-chip tester/recovery assist unit 350 on the critical reliability information.

The configuration setting storage device 430 of the non-volatile memory 400 stores a current configuration setting for the chip resources. This configuration setting may be provided to the on-chip reliability controller 330 by the finite state machine controller 410 for use in maintaining the reliability of the chip. The settings in this configuration setting may be accessed by an off-chip tester/recovery assist unit 350 and may be updated by such an off-chip tester/recovery assist unit 350 via the interface 432. For example, the off-chip tester/recovery assist unit 350 may analyze and diagnose the source of a major failure of the chip based on the critical reliability information retrieved from the critical reliability information storage device 420 via the interface 422. The off-chip tester/recovery assist unit 350 may further retrieve the current configuration settings for the on-chip reliability controller 330 from the configuration setting storage device 430 via the interfaced 432. From this information, the off-chip tester/recovery assist unit 350 may determine new configuration settings to avoid the occurrence of the same failure from the same failure source in the future. These new configuration settings may be written back to the configuration setting storage device 430 via the interface 432 to thereby overwrite the previous configuration settings. The finite state machine controller 410 may provide these new configuration settings to the on-chip reliability controller 330, such as upon a re-initialization of the chip, so that the on-chip reliability controller 330 uses these new configuration settings when controlling the operation of the chip for purposes of reliability.

As one example, with reference again to FIG. 4B, the off-chip tester/recovery assist unit 350 may analyze the data structure(s) in the on-chip non-volatile storage device and identify a failure criticality level for each computational core, processor, and/or functional unit based on field 425 in the data structure(s). The off-chip tester/recovery assist unit 350 may look at the failure criticality levels of the cores, for example, and compile a listing of cores that have failure criticality levels that are less than an initial threshold, e.g., find all cores having a failure criticality level less than 3 (where higher number failure criticality levels represent lower criticality, e.g., criticality of 1 is more critical than a criticality of 2, 3, 4, etc.). The off-chip tester/recovery assist unit 350 may then determine if there is a sufficient number of cores in the list that is required for restart of the chip. The required number of cores for restart may be obtained, for example, from the list of operation states 412 in the on-chip non-volatile memory 400. If there is sufficient number of cores in the list, then this list may be used to update the target starting state in the configuration setting storage device 430. If there is not sufficient number of cores, then additional cores may be added until the required number of cores is met, e.g., cores having failure criticality levels of 3 may then be added one at a time until the required number of cores is met, and so on. In this way, the criticality level of the cores in the list is minimized (i.e. larger numbers represent smaller criticality). Another way to say this is to say that the sum of the criticality levels is maximized. There are various methodologies and logic that may be used for determining the target starting state information to be included in the configuration setting storage device 430, all of which cannot be succinctly described herein but are intended to be within the spirit and scope of the present invention.

Thus, the mechanisms of the illustrative embodiments provide non-volatile mechanisms for maintaining critical reliability information regarding failures of resources of a chip to operate within predefined configuration settings. This information may be maintained even in the event of a major failure of the chip such that the critical reliability information is accessible by off-chip devices for purposes of analysis and diagnosis of the major failure. Moreover the non-volatile mechanisms of the illustrative embodiments store configuration setting information for use by such off-chip devices in the event of a major failure so that the off-chip devices may determine how the chip was configured at the time of the major failure. These configuration settings may be overwritten by the off-chip devices for use by an on-chip reliability controller to thereby adjust the operation of the chip to ensure greater reliability with regard to this same failure and source of failure in the future.

Figure 5:
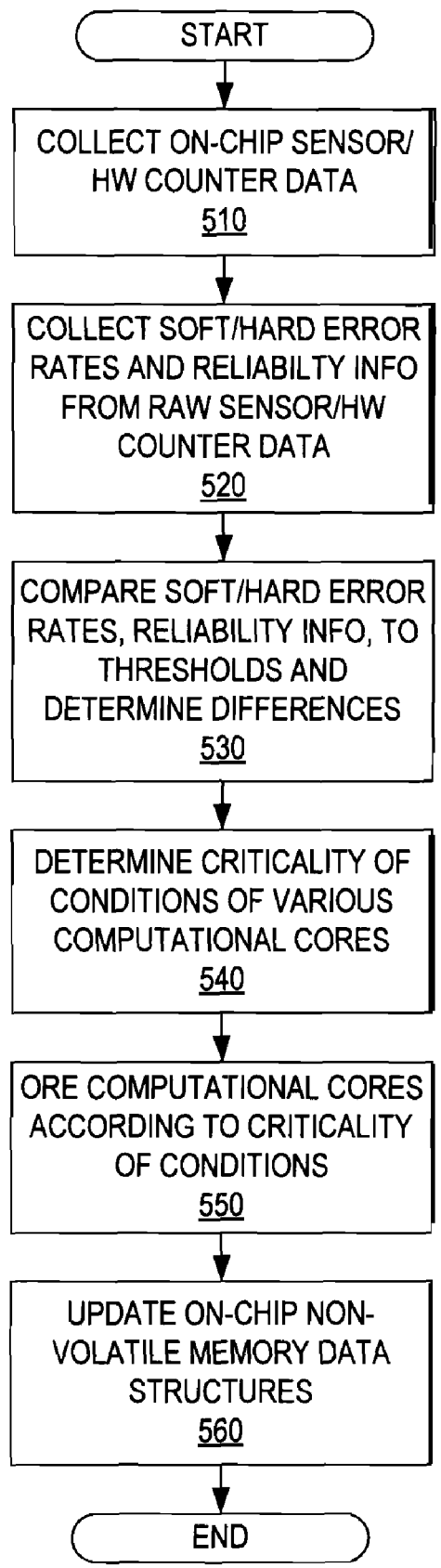
FIG. 5 is a flowchart outlining an example operation of an on-chip reliability engine in accordance with one illustrative embodiment.

FIG. 5 is a flowchart outlining an example operation of an on-chip reliability engine in accordance with one illustrative embodiment. It should be appreciated that the operation outlined in FIG. 5 may be implemented, for example, in hardware of a microprocessor chip. The operation shown in FIG. 5 may be performed for each computational core of a chip, for example. In other illustrative embodiments, the operation shown in FIG. 5 may be performed at other granularities and various granularities including performing the operation for each functional unit of each computational core and/or each other type of resource of the computational cores.

As shown in FIG. 5, the operation starts by collecting on-chip sensor/hardware counter data (step 510). As mentioned above, various on-chip sensors, such as thermal sensors, frequency sensors, and the like, as well as hardware counters may be provided on the chip and may monitor the operation of the chip's resources, e.g., computational cores and the like. These sensors/counters collect data as the chip's resources operate and provide the collected data to an on-chip reliability controller.

The on-chip reliability controller collects soft error and/or hard error rates and reliability information from the raw sensor/counter data (step 520). For example, the on-chip reliability controller may analyze the raw sensor/counter data in accordance with logic of the on-chip reliability controller to thereby extract this soft error and/or hard error rate and reliability information for use in evaluating the reliability of the chip over a period of time.

The soft error/hard error rates and reliability information for each of the computational cores is compared to one or more on-chip critical condition checking thresholds and differences between the soft/hard error rates, reliability information, and the like, with regard to these thresholds is calculated (step 530). Based on these differences, a criticality of the conditions of the various computational cores may be determined (step 540) and the computational cores are ordered according to the criticality of their conditions (step 550). It should be appreciated that, in addition, the reliability information and soft/hard error rate information may further be compared between computational cores to identify outliers that are indicative of faulty or otherwise failing cores.

Having ordered the computational cores according to criticality, this ordering may be normalized based on workload information and system software logs (step 555). What is meant by this is that if the on-chip resources are intentionally being overloaded to maximize performance at the expense of reliability, then such conditions should not be included as actual critical conditions since they are not indicative of a failure of the hardware resources. Thus, any such critical conditions may be filtered out through this normalization process so that the ordering of the computational cores based on critical conditions only includes those computational cores whose critical conditions are due to some failure of one or more hardware elements of the computational cores.

The on-chip non-volatile memory data structures are then updated with the soft error/hard error, reliability information, and critical condition information for each of the computational cores (step 560). These data structures may store, for example, an assessed reliability level or level of a violation of a threshold based on condition check, a history of past failures as obtained from a history of sensors and other checks exceeding acceptable ranges and/or a failure history (which core/block failed, when, magnitude of failure etc.), a length and criticality of condition failures, i.e. conditions not falling within acceptable thresholds, details of the condition failures, and the like. The operation then terminates.

Figure 6:
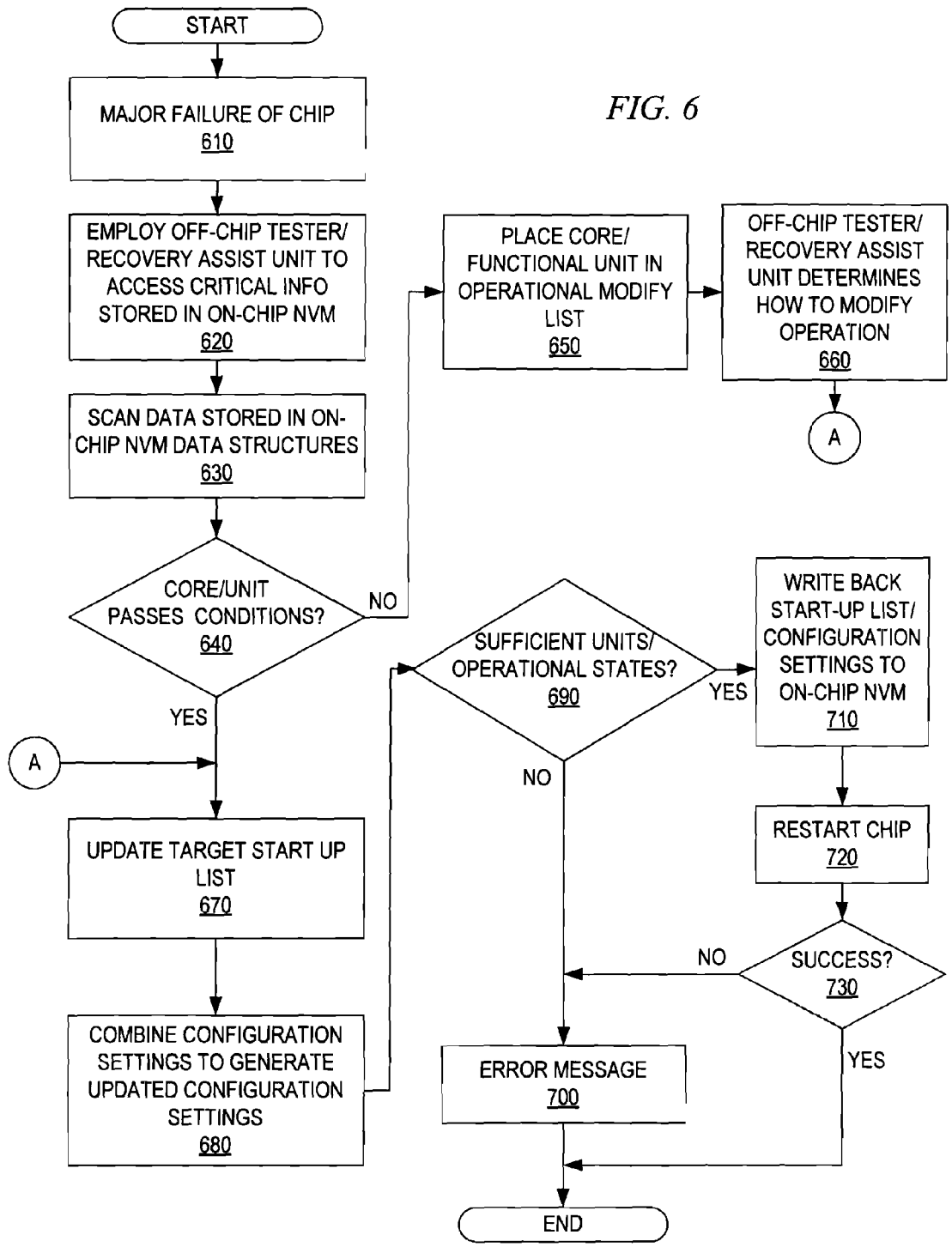
FIG. 6 is a flowchart outlining one possible operation of an off-chip tester/recovery assist unit in accordance with one illustrative embodiment.

FIG. 6 is a flowchart outlining one possible operation of an off-chip tester/recovery assist unit in accordance with one illustrative embodiment. The operations shown in FIG. 6 may be implemented in hardware, software, or any combination of hardware and software. As described previously, the off-chip tester/recovery assist unit operates on critical reliability information stored in the on-chip non-volatile memory and may write back configuration information to the on-chip non-volatile memory for purposes of configuring the chip's operation through an on-chip reliability controller.

As shown in FIG. 6, the operation starts with the occurrence of a major failure of the chip (step 610). A "major"

failure is a failure that affects availability of a resource, hardware element, the chip as a whole, or the like. An example of a major failure is a full power-down of the chip due to an operational state of the chip exceeding an acceptable level. It should be noted that while the present application describes the failure of the chip as a "major" failure, the mechanisms of the illustrative embodiments may be applied to any failure of the resources, elements, etc., of the chip that would be significant enough to warrant a change in chip configuration to avoid such failures in the future.

In response to the major failure, an off-chip tester/recovery assist unit may be employed to access the critical reliability information stored in the on-chip non-volatile memory of the on-chip reliability engine (step 620). The off-chip tester/recovery assist unit may scan the data stored in the on-chip non-volatile memory's data structures (step 630) and, for each computational core and/or functional unit on the chip, determine if the computational core passes all reliability conditions established by the off-chip tester/recovery assist unit (step 640).

It should be appreciated that the operations in steps 630 and 640 may be performed for each of the computational cores/functional units of the chip. In this way, the off-chip tester/recovery assist unit may analyze and diagnose the critical reliability information stored in the on-chip non-volatile memory data structures to identify the computational core(s), functional units within the computational core(s), or other granularity of functional unit, that may have been the source of the problems leading to the major failure and the conditions of these cores that lead to the failure. As will be evident from the remaining operations in FIG. 6, each of these cores/functional units is then placed in one of two data structures, either a start-up list data structure or a operational modify list data structure. The start-up list data structure stores the necessary information to identify the computational cores/functional units that should be started up when the chip is restarted, while the operational modify list data structure stores the necessary information to identify those computational cores/functional units whose operation may need to be modified due to a critical condition.

If a computational core, or functional unit, does not pass all the reliability conditions, the computational core/functional unit may be placed in an operational modify list data structure (step 650). This operational modify list data structure stores the identifiers of the computational cores or functional units whose operations need to be modified to ensure reliability of the chip upon restart of the chip. This modification may involve, for example, changing an operational frequency of the core/functional unit, changing thermal limits for the core/functional unit, or the like. In some cases, the modification may mean inhibiting the start up of the computational core/functional unit all together. The off-chip tester/recovery assist unit determines, for each core/functional unit in the operational modify list data structure, how to modify the operation of the core/functional unit to achieve greater reliability of the chip and avoid the major failure that occurred (step 660). This results in an update to configuration settings, in the on-chip non-volatile memory, for the cores/functional units in the operational modify list data structure.

If a computational core, or functional unit, passes all the reliability conditions, an identifier of the core/functional unit is placed in a target start up list data structure (step 670). The configuration settings for the cores/functional units in the target start up list, and those in the operational modify list data structure whose start up is not completely inhibited, are combined to generate an updated start-up list data structure and configuration settings data structure which identify the cores/functional units that will be started upon restart of the chip and their corresponding configuration settings (step 680).

A determination is made as to whether there is a sufficient number of cores/functional units in the updated start up list and configuration settings data structure as well as a correct operational state for these cores/functional units (step 690). This determination may involve comparing the start-up list data structure and/or the configuration setting data structure to the required operational states as specified in the list of operation states data structure of the on-chip non-volatile memory, for example. Thus, for example, if the number of cores in the start up list does not meet a requirement as set forth in the list of operation states, a particular core that is required for start up is not in the start up list, a required minimum frequency of operation is not met by all of the cores in the start up list, or the like, then this determination may result in a finding that a correct operational state is not present. If a sufficient number of cores/functional units is not present or a required operational state is not present, an error message may be output in order to have a user intervene with the restarting of the chip (step 700).

It should be appreciated that, instead of sending an error message upon a first attempt to generate a start-up list and configuration setting data structure meeting the requirements of the list of operation states, the illustrative embodiments may make a predetermined number of attempts to select a set of cores/functional units and configuration settings for these cores/functional units that meet the requirements of the list of operation states before sending such an error message. That is, steps 630-690 may be repeated multiple times before progressing to step 700. If, during one of these repeated attempts the result of the determination in step 690 is "yes", then the operation may continue to step 710 without continued repeated attempts. If after the predetermined number of attempts have been made, there is still not enough cores/functional units in the start-up list or a configuration setting meeting the minimum requirements of the list of operation states cannot be found, then the operation may continue to step 700.

If there is sufficient number of cores/functional units in the updated configuration settings data structure and a correct operational state is present, then the updated start-up list and configuration settings data structure are written back to the on-chip non-volatile memory (step 710), and a restart of the chip is initiated (step 720). During restart of the chip, the on-chip reliability controller may retrieve the updated configuration settings data structure from the on-chip non-volatile memory and use it to control the operation of the cores/functional units in accordance with the configuration settings.

A determination is made as to whether the chip restart was successful or not (step 730). If the restart was not successful, an error message may again be output in order to have a user intervene with the recovery of the chip (step 700). Otherwise, if the restart was successful, the operation terminates.

Thus, the illustrative embodiments provide a mechanism for storing critical reliability information regarding the operational states of on-chip resources in a non-volatile manner such that this critical reliability information is accessible even after a major failure of the chip. The critical reliability information in the on-chip non-volatile memory may be used by off-chip mechanisms after a major failure to analyze and diagnose the failure and possible sources of the failure so as to modify configuration settings of the chip to avoid such failures due to the same possible sources of failure again in the future. In this way, critical reliability information that is otherwise lost by known mechanisms in the event of a major failure is retained by the mechanisms of the illustrative embodiments so that greater insight into the causes of such major failures is made possible without having to utilize complex off-chip external center-level software logs that require specialized software.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon. For example, the operations described above with regard to the off-chip tester/recovery assist unit may be implemented in a computer program product having instructions that are executed by one or more data processing devices. Moreover, other aspects of the on-chip reliability controller, the FSM, or the like, may be implemented in software, or a combination of software and hardware, where the software aspects are executed on one or more processing devices, rather than the functionality of these elements being entirely embodied within hardware.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to the illustrative embodiments of the invention. It will be understood that, unless otherwise indicated, each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code in accordance with aspects of the illustrative embodiments will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for storing selected reliability information in an on-chip non-volatile storage device, comprising:
    collecting, by an on-chip reliability controller coupled to one or more on-chip resources of a microprocessor chip, raw reliability information from the one or more on-chip resources of the microprocessor chip;
    analyzing, by the on-chip reliability controller, the raw reliability information to identify selected reliability information for the one or more on-chip resources of the microprocessor chip; and
    storing the selected reliability information in the on-chip non-volatile storage device, wherein the on-chip non-volatile storage device has an interface through which the selected reliability information is accessible by an off-chip device in the event of an overall failure of the microprocessor chip.

2. The method of claim 1, wherein the on-chip reliability controller collects the raw reliability information from at least one of one or more hardware sensors or one or more hardware counters associated with the one or more on-chip resources of the microprocessor chip.

3. The method of claim 1, wherein analyzing the raw reliability information to identify selected reliability information for the one or more on-chip resources of the microprocessor chip comprises:
    generating a reliability profile in the on-chip reliability controller that stores reliability information identifying at least a subset of the on-chip resources, associated failures of the subset of on-chip resources, and a criticality level of the associated failures of the subset of on-chip resources; and
    filtering the reliability profile based on at least the criticality level of the associated failures of the subset of on-chip resources.

4. The method of claim 3, wherein the reliability profile is generated by:
    comparing the raw reliability information to one or more threshold conditions;
    determining if the one or more threshold conditions are violated by the raw reliability information; and
    in response to a determination that the one or more threshold conditions are violated by the raw reliability information, writing an entry to the reliability profile identifying a on-chip resource associated with the raw reliability information, a type of failure associated with the determination, and a criticality level of the failure associated with the determination.

5. The method of claim 4, wherein the one or more threshold conditions are stored in the on-chip non-volatile storage device and are accessible to the on-chip reliability controller.

6. The method of claim 1, further comprising:
    storing a history of selected reliability information in the on-chip non-volatile storage device, wherein the history of selected reliability information comprises selected reliability information for the on-chip resources of the microprocessor chip for a previous period of time.

7. The method of claim 1, wherein the on-chip non-volatile storage device is one of a bank of eFuses, an electrically erasable programmable read only memory (EEPROM), a magnetoresistive random access memory, a resistive random access memory (RRAM), or a phase change memory.

8. The method of claim 1, wherein the on-chip non-volatile storage device stores the critical reliability information even in the event of an overall failure of the microprocessor chip in which the microprocessor chip loses power.

9. The method of claim 1, further comprising:
    accessing, by an off-chip device, the on-chip non-volatile storage device in response to a failure of the microprocessor chip;
    analyzing the selected reliability information in the on-chip non-volatile storage device to identify new start-up configuration settings for the microprocessor chip; and
    attempting a restart of the microprocessor chip using the new start-up configuration settings for the microprocessor chip.

10. The method of claim 9, wherein attempting a restart of the microprocessor chip using the new start-up configuration settings for the microprocessor chip comprises:
    writing, by the off-chip device, the new start-up configuration settings to the on-chip non-volatile storage device;
    accessing, by the on-chip reliability controller, the new start-up configuration settings stored in the on-chip non-volatile storage device; and
    restarting, by the on-chip reliability controller, the microprocessor chip using the new start-up configuration settings accessed from the on-chip non-volatile storage device.

11. An apparatus, comprising:
    at least one on-chip resource of a microprocessor chip;
    an on-chip reliability controller coupled to the at least one on-chip resource of the microprocessor chip; and
    an on-chip non-volatile storage device coupled to the on-chip reliability controller, wherein the on-chip reliability controller;
    collects raw reliability information from the one or more on-chip resources of the microprocessor chip;
    analyzes the raw reliability information to identify selected reliability information for the one or more on-chip resources of the microprocessor chip; and
    stores the selected reliability information in the on-chip non-volatile storage device, wherein the on-chip non-volatile storage device has an interface through which the selected reliability information is accessible by an off-chip device even in the event of an overall failure of the chip.

12. The apparatus of claim 11, further comprising:

one or more hardware sensors coupled to the one or more on-chip resources of the microprocessor chip; and one or more hardware counters associated with the one or more on-chip resources of the microprocessor chip, wherein the on-chip reliability controller collects the raw reliability information from the one or more hardware sensors and one or more hardware counters.

13. The apparatus of claim 11, wherein the on-chip reliability controller analyzes the raw reliability information to identify selected reliability information for the one or more on-chip resources of the microprocessor chip by:

generating a reliability profile in the on-chip reliability controller that stores reliability information identifying at least a subset of the on-chip resources, associated failures of the subset of on-chip resources, and a criticality level of the associated failures of the subset of on-chip resources; and filtering the reliability profile based on at least the criticality level of the associated failures of the subset of on-chip resources.

14. The apparatus of claim 13, wherein on-chip reliability controller generates the reliability profile by:

comparing the raw reliability information to one or more threshold conditions;

determining if the one or more threshold conditions are violated by the raw reliability information; and in response to a determination that the one or more threshold conditions are violated by the raw reliability information, writing an entry to the reliability profile identifying a resource associated with the raw reliability information, a type of failure associated with the determination, and a criticality level of the failure associated with the determination.

15. The apparatus of claim 14, wherein the one or more threshold conditions are stored in the on-chip non-volatile storage device and are accessible to the on-chip reliability controller.

16. The apparatus of claim 11, wherein the on-chip non-volatile storage device further stores a history of selected reliability information in the on-chip non-volatile storage device, wherein the history of selected reliability information comprises selected reliability information for the resources of the chip for a previous period of time.

17. The apparatus of claim 11, wherein the on-chip non-volatile storage device is one of a bank of eFuses, an electrically erasable programmable read only memory (EEPROM), a magnetoresistive random access memory, a resistive random access memory (RRAM), or a phase change memory.

18. The apparatus of claim 11, wherein the on-chip non-volatile storage device stores the critical reliability information even in the event of an overall failure of the microprocessor chip in which the microprocessor chip loses power.

19. The apparatus of claim 11, further comprising:

an interface through which an off-chip device accesses the on-chip non-volatile storage device, and wherein the off-chip device:

accesses the on-chip non-volatile storage device, via the interface, in response to a failure of the chip;

analyzes the selected reliability information in the on-chip non-volatile storage device to identify new start-up configuration settings for the chip; and attempts a restart of the chip using the new start-up configuration settings for the chip.

20. The apparatus of claim 19, wherein the off-chip device attempts a restart of the chip using the new start-up configuration settings for the chip by writing; via the interface, the new start-up configuration settings to the on-chip non-volatile storage device, and wherein the on-chip reliability controller:

accesses the new start-up configuration settings stored in the on-chip non-volatile storage device; and restarts the chip using the new start-up configuration settings accessed from the on-chip non-volatile storage device.

\* \* \* \* \*